United States Patent [19]

Mercer

[11] 4,303,714
[45] Dec. 1, 1981

[54] PLASTICS MATERIAL MESH STRUCTURE

[75] Inventor: Frank B. Mercer, Blackburn, England

[73] Assignee: P.L.G. Research Limited, Lancashire, England

[21] Appl. No.: 82,524

[22] Filed: Oct. 9, 1979

[30] Foreign Application Priority Data

Oct. 16, 1978 [GB] United Kingdom ............... 40640/78

[51] Int. Cl.³ .................. B32B 3/10; B29C 17/02
[52] U.S. Cl. .................... 428/135; 428/134; 428/136; 428/156; 428/255; 428/910; 428/332; 264/288.8; 264/DIG. 81; 264/291
[58] Field of Search ................ 428/134–136, 428/910, 131, 255, 107, 156, 332; 264/DIG. 81, 288.8, 291

[56] References Cited

U.S. PATENT DOCUMENTS

| | | |
|---|---|---|
| 2,361,369 | 10/1944 | Grebe et al. |
| 3,255,056 | 6/1966 | Wyckoff ............ 428/910 X |
| 3,386,876 | 6/1968 | Wyckoff ............ 428/134 |
| 3,642,967 | 2/1972 | Doll . |
| 3,666,609 | 5/1972 | Kalwaites et al. . |
| 4,020,208 | 4/1977 | Mercer et al. ............ 428/910 X |
| 4,123,491 | 10/1978 | Larsen ............ 428/134 X |
| 4,140,826 | 2/1979 | Liu ............ 428/910 X |

FOREIGN PATENT DOCUMENTS

| | | |
|---|---|---|
| 1435107 | 10/1968 | Fed. Rep. of Germany . |
| 1504700 | 9/1970 | Fed. Rep. of Germany . |
| 368393 | 7/1906 | France . |
| 922131 | 3/1963 | United Kingdom . |
| 969205 | 9/1964 | United Kingdom ............ 428/135 |
| 1058445 | 2/1967 | United Kingdom . |
| 1075487 | 7/1967 | United Kingdom . |
| 1170639 | 11/1969 | United Kingdom . |
| 1235901 | 6/1971 | United Kingdom . |
| 1276300 | 6/1972 | United Kingdom . |
| 1310474 | 3/1973 | United Kingdom . |
| 1378750 | 12/1974 | United Kingdom . |

*Primary Examiner*—Marion McCamish
*Assistant Examiner*—Alexander S. Thomas
*Attorney, Agent, or Firm*—Holman & Stern

[57] ABSTRACT

In order to form an improved junction which is less liable to tear under shock loads, a diamond pattern of holes (or depressions) is formed in plastics material sheet. The holes are then in two sets of parallel lines each making an angle to the subsequent stretching direction and the holes are also in parallel rows at right angles to the stretching direction. The sheet is stretched so that the zones between adjacent holes in each line form orientated strands and the zones between adjacent holes in each row form junctions which have their lateral zones orientated but have a central zone which is unorientated or less orientated, i.e. which is thicker. The central zone can extend into two opposite crotches or be completely surrounded by highly orientated lateral zones.

14 Claims, 12 Drawing Figures

PLASTICS MATERIAL MESH STRUCTURE

BACKGROUND OF THE INVENTION

The invention relates to integral plastics material diamond mesh structures comprising mesh openings defined between orientated strands and junctions interconnecting the strands, and to methods of producing them by stretching special starting materials. British Patent No. 969,205 (Monosilio) shows a final product which has orientated strands and flat orientated junctions. The centres of the junctions can split relatively easily under shock loads.

Definitions

The term "substantially uniplanar" can include starting material exhibiting some biplanar characteristics such as integrally extruded net where the strand central axes lie in two planes separated by about 50% of the strand depth. The sheet should not deviate so much from uniplanarity that the junctions cannot assume the forms required by the structures of the invention.

The term "rectangular" or "rectangle" includes square.

The term "orientated" means molecularly orientated.

The terms "thick", "thickness", "deep" and "depth" refer to the dimension normal to the plane of the starting material or mesh structure and the term "width" refers to the appropriate dimension in the plane of the starting material or mesh structure.

The thickness or depth of a strand is the thickness of the strand cross-section, but ignoring raised edges. Particularly if the original holes or depressions have no radiussing where they issue at the faces of the starting material, the strands will have a "pin-cushion" cross-section, with raised edges and lower centres; the thickness will be as measured inwardly of the raised edges.

The depressions are not necessarily formed by the application of pressure.

The Invention

The invention provides a method and structures.

The continuous lines of orientated plastics material running through the structure provide good strength in the structure in one direction, enabling the net to be used for instance for packaging or agricultural or horticultural use, and, as explained hereafter, there may also be continuous lines of orientated plastics material running through the structure in the direction at right angles to the first direction, providing structures which can be used for, for instance, fishing nets. The method gives good control of the exact position of orientation and enables good sized thicker zones to be left in the junctions, which are more resistant to shock loads.

DESCRIPTION OF PREFERRED EMBODIMENTS

The invention will be further described, by way of example, with reference to the accompanying drawings, in which.

Figure 1A:
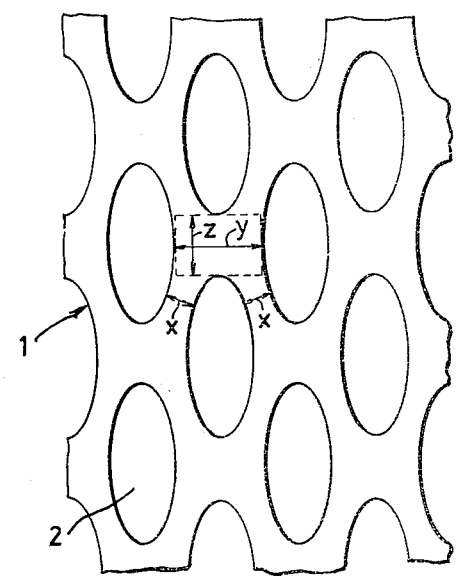
FIGS. 1a and 1b show a starting material and finished structure using the invention.

In FIG. 1a, the starting material is in the form of a plastics material sheet 1 having substantially planar, parallel faces and comprising a pattern of holes or depressions 2 whose centres are on a diamond or rhombus grid, in two sets of parallel lines which are at a substantial angle to each other. In effect, the holes or depressions 2 are staggered and in rows; although the holes or depressions 2 of adjacent rows preferably overlap, this is believed not to be essential.

Figure 1B:
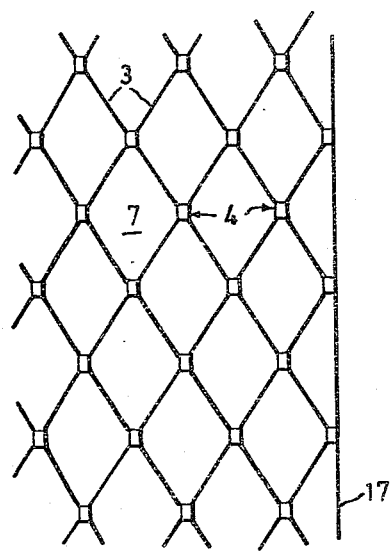

On stretching in the vertical direction (looking at FIG. 1a), the zones indicated by x will stretch first and form oriented strands 3 (FIG. 1b) interconnected by junctions 4 formed from the zones indicated by the notional rectangles y, z. The strands 3 are stretched to such an extent that the orientation passes down each side of the junction 4, forming orientated lateral zones 5 (FIG. 2a) which extend parallel to the direction of stretching and pass on either side of single central zones or masses 6 of unorientated or less orientated plastics material. The crotches at the sides of the junction 4, between respective adjacent strands 3, are thus orientated, the preferred direction of orientation extending around each crotch. The strands 3 must have sufficient strength to stretch out the lateral zones 5.

It is believed that the notional rectangle y.z. should not be stretched first or instantaneously with the zones x, and that the structure of the invention may not always be produced even when the notional rectangle y.z. is stretched after the zones x. As a general indication without being limited thereby, it is believed that the dimension y should be substantially greater than the dimension z, and the ratio y:z is preferably at least 1.5:1 and suitably as large as practicable.

Figure 2A:
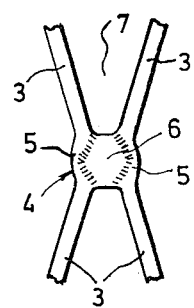
FIGS. 2a to 2c show the junctions in FIG. 1b on a larger scale, at three different stages of stretching (FIG. 2c is on a larger scale than that of FIGS. 2a and 2b).

FIG. 2a shows the first type of junction 4 which is produced, namely having a generally hexagonal, thicker single central zone or blob 6 which extends from the upper crotch to the lower crotch, and acts as a tear blocker in these crotches, resisting tearing if the structure is tensioned in use in the direction at right angles to the direction of stretching during production. There are continuous lines of orientated plastics material running through the structure generally in the direction of stretching, each line comprising in succession the strand 3 of one mesh opening 7, the lateral zone 5 of a junction 4, the strand 3 of the next mesh opening, and so on.

Figure 2B:
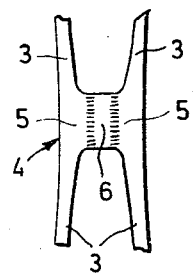

In the junction 4 of FIG. 2b, further stretch has been applied in the first direction of stretch so that the central mass 6 is somewhat narrower and the lateral zones 5 are somewhat wider. The central mass 6 can still contain some unorientated plastics material, or at least plastics material which is substantially less orientated than that of the lateral zones 5.

The stretching in the first direction must be terminated before the centre of the central mass 6 is pulled out—if stretching is continued, the centre of the mass 6 can be pulled right out and fully orientated.

Figure 2C:
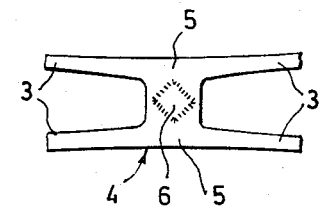

To improve the strength of the material in the direction at right angles to the first direction of stretching, the structure can be stretched at right angles to the first direction of stretching to orientate the top and bottom ends of the blob or mass 6 shown in FIG. 2a or 2b and produce the junction 4 shown in FIG. 2c. In FIG. 2c, the mass 6 is shown as being of generally square shape with the corners of the square directed towards the crotches between adjacent strands 3, but it may alternatively have a rather more rounded shape. There are lateral zones 5 completely surrounding (as seen in plan) the mass 6, each of the crotches having orientated plastics material whose direction of orientation runs around the crotch. In effect, there are now also continuous lines of orientated plastics material running through the structure in the direction normal to the first direction of stretching. Such a structure can be used for instance for fishing nets.

In the junction of any of FIGS. 2a to 2c, the mass 6 can have substantially the same thickness as that of the starting material and be at least twice as thick as the lateral zones.

EXAMPLE 1

3 mm polypropylene sheet was punched with 3.18 mm diameter circular holes at a transverse pitch of 9.78 mm and a longitudinal pitch of 5.54 mm. The holes had their centres on two sets of notional parallel lines each making an angle of 30° with the transverse direction. Distances x, y and z were 2.54 mm, 6.60 mm and 2.36 mm, respectively, the y:z ratio being 2.8:1. The sheet was given a 7.5:1 stretch (measured after relaxation) in the longitudinal direction at 97° C., with no constraint in the transverse direction. The stretch ratio was measured by comparing the longitudinal dimensions of the holes before and after stretching. The structure produced was similar to that of FIG. 2a. The thickness of the mid-point of the strands 3 was 1.12 mm, the thickness of the mass 6 was 2.93 mm and the thickness of the lateral zones 5 was 1.12 mm.

EXAMPLE 2

1.5 mm HDPE (high density polyethylene) sheet was punched with 1.5 mm diameter circular holes at a diagonal pitch of 3 mm and a transverse pitch of 5.3 mm, and was given at 97° C., a 7:1 overall stretch (measured after relaxation) in the longitudinal direction, with no constraint in the transverse direction, to produce a structure similar to that of FIG. 2b.

EXAMPLE 3

The product of Example 1 was stretched at 97° C. in the transverse direction with no constraint in the longitudinal direction until the thickness of all the lateral zones 5, all the way round the central mass 6, was uniform. The structure produced was similar to that of FIG. 2c.

Figure 3:
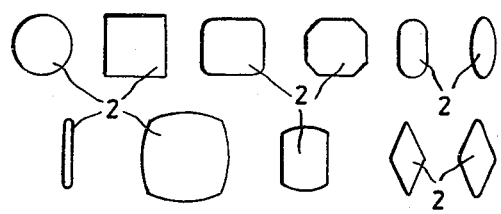
FIG. 3 shows various shapes for the holes or depressions in the starting material.

FIG. 1a shows a preferred shape for the holes or depressions 2, namely long-shaped and more particularly elliptical—another preferred shape is the slot with radiussed ends shown in FIG. 3, left-hand side of the second row; these shapes reduce the amount of starting material required. If a single stretching operation is being carried out in an in-line process, the stretching operation is preferably carried out in the machine direction and the major axes of the holes or depressions 2 preferably extend parallel to the first direction of stretching. This in effect enables a wider mesh structure to be produced from a starting material of a fixed width. If two sequential stretching operations are being carried out, the first one may be in the transverse direction, in which case the major axes of the holes or depressions 2 can extend normal to the first direction of stretching.

FIG. 3 shows many different shapes which can be used for the holes or recesses 2. The holes or depressions preferably occupy substantially less than 50% or 25% of the plan view area of the sheet 1.

For increased tear strength, each strand 3 should be sufficiently deep (in relation to its width), where it passes into a junction; it is preferred for this reason that, at its mid-point (normally its narrowest part) each strand 3 should have a width which is not more than 1.5 times its depth; the relatively deep strands so produced act as tear blockers at the junctions. For this purpose, the dimension x should be suitably chosen in relation to the thickness (d) of the sheet 1, and the x:d ratio is preferably 1.5:1 or less, e.g. 1:1 or 1:1.5.

It is believed that, in theory, it does not matter whether the first stretching operation is carried out in the transverse direction or in the machine direction in a continuous production plant.

The starting material may be of flat form or tubular, and may be a mesh structure or a ribbed structure.

Figure 4:
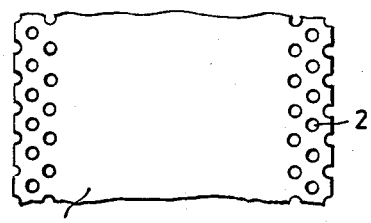
FIG. 4 shows a way of punching the starting material.

The starting material can be of any suitable thickness though in general terms a range of 0.125 to 12.5 mm is preferred, narrower preferred limits being at least 0.5 mm and at most 5 mm; the starting material can be in sheet form or tubular. The preferred starting material is strictly uniplanar, by which is meant that, ignoring any membrane (which may not lie on the median plane), all zones of the starting material are symmetrical about the median plane of the starting material. Inherently, the stretched mesh structure produced from such a starting material according to this invention, will also have all zones symmetrical about its median plane. However, insubstantial departures from uniplanarity are not excluded. The holes (or depressions if suitable) can be formed by punching or by forming them as the starting material itself is formed, obturating a slit die for instance generally as in French Pat. No. 368 393. If the starting material is tubular, it can be punched in flat form as a "lay-flat" tube. As shown in FIG. 4, the edge folds of the lay-flat tube 11 can be punched so that the pattern of holes around the whole periphery of the tube is substantially uniform.

In general, it is preferred to avoid any substantial protruberance around the periphery of the holes or depressions.

If depressions are formed, the membrane closing the depression can be ruptured during stretching and the residual film-like material removed.

The starting material is preferably not substantially orientated, though melt flow orientation can be present.

The starting material can be any suitable thermoplastics material, such as for instance HDPE, low density polyethylene, polypropylene, copolymers of HDPE and polypropylene, and polyamides. The starting material can have a skin on each face containing an ultra-violet stabiliser—the greater the width:depth ratio of the orientated strands in the product the more effective the ultra-violet stabilisation as the unstabilised sides of the strands and junctions form a smaller proportion of the total surface area.

After stretching, the structures can be annealed in a manner well known.

Figure 5:
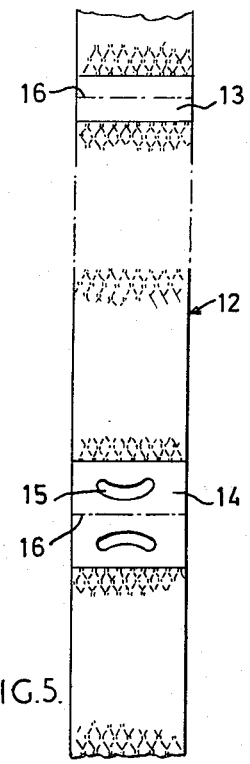
FIG. 5 shows a finished structure designed for a particular purpose.

FIG. 5 illustrates that the structure need not be uniform along its length, and that specific nonuniformities can be introduced for specific purposes, for instance to produce a carrier bag. In the case as shown in FIG. 5, the structure 12 is of tubular form and at regular intervals has an unstretched piece of unperforated plastics material 13, and an unstretched piece of plastics material 14, which has holes 15 for a carrying handle. The tube is cut along the dot-dash lines 16, and can either be sealed across the piece 13 or across the piece 14, as desired, to produce a top-filled or bottom-filled, prepacked carrier bag.

Figure 6C:
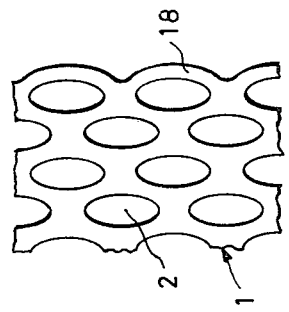
FIGS. 6a to 6c show various edge shapes.
Figure 6B:
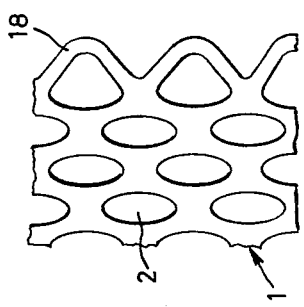
Figure 6A:
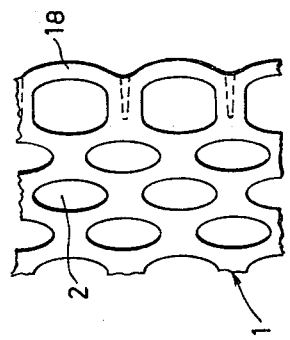

FIGS. 6a to 6c show that, for instance for a fishing net, a selvedge 17 (see FIG. 1b) can be provided by forming a wavy edge 18 on the starting material (FIG. 6a shows an alternative in dashed lines). Thus, the starting material has a non-rectilinear edge so that when the starting material is stretched, the edge zones stretch to a ratio which is not substantially greater than that of the zones between immediately adjacent holes or depressions in each line. In this way, the selvedge 17 is not overstretched. The selvedge 17 can be made wider and/or thicker than the strands 3 by suitably widening the wavy edge 17 and/or thickening it.

The finished structures of the invention will be packaged in the normal way, for instance in the form of a roll, for commercial sale.

Figure 7:
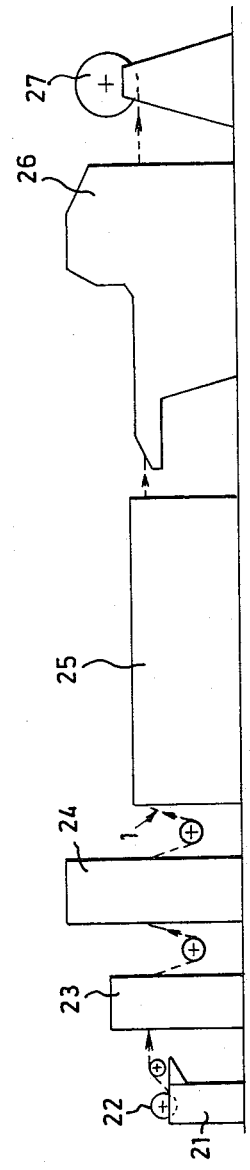
FIG. 7 shows a plant for producing a mesh structure in accordance with the invention.

FIG. 7 shows a plant that can be used for the commercial production for the mesh structure. The plant is shown schematically, but the units themselves are conventional units.

There is a let-off unit 21 supporting a roll 22 of unperforated starting material which passes through the plant along the path indicated by the dashed lines and arrows. The starting material passes through a sheet flattening unit 23, a perforator 24, a transverse direction orientation (stretching) machine 25, a machine direction orientation (stretching) machine 26 and is wound up on a wind-up unit 27. In the second orientation machine 26, one should avoid too short a distance between the nips in order to allow some sideways contraction of the mesh structure. The first orientation machine will be omitted if the structure of FIG. 2a or 2b is being produced.

I claim:

1. An integral plastic material diamond mesh structure, formed from a substantially uniplanar plastic starting material comprising mesh openings defined between orientated strands and junctions interconnecting the strands, substantially each junction having all its lateral zones orientated, so providing continuous lines of orientated plastic material running through the structure, each line comprising in succession a strand, the lateral zone of a junction, another strand, the lateral zone of the next junction, and so on, substantially each junction having a central zone of plastic material which is thicker than the lateral zones and is either unorientated or substantially less orientated than the lateral zones, the central zone being completely surrounded, as seen in plan, by the orientated plastic material of the lateral zones, all zones of said mesh structure being symmetrical about a median plane corresponding substantially to the median plane of the uniplanar starting material.

2. An integral plastic material diamond mesh structure formed from a substantially uniplanar plastic starting material, comprising mesh openings defined betwen orientated strands, and junctions interconnecting the strands, substantially each junction having orientated lateral zones which provide continuous lines of orientated plastic material running through the structure, each line comprising in succession a strand, the lateral zone of a junction, another strand, the lateral zone of the next junction, and so on, each junction having between its lateral zones a single zone of plastic material which is thicker than the lateral zones and is either unorientated or substantially less orientated than the lateral zones, which single zone forms at least part of two opposite crotches between respective adjacent strands interconnected by the junction, all zones of said mesh structure being symmetrical about a median plane corresponding substantially to the median plane of the uniplanar starting material.

3. The structure of claim 2, wherein said single zone is of generally hexagonal shape with two opposite sides thereof in said crotches.

4. The structure of claim 2, wherein said single zone is of generally rectangular shape with two opposite sides thereof in said crotches.

5. The structure of claim 2, wherein at its narrowest part, the width of each strand is not more than 1.5 times its depth.

6. A method of producing an integral plastic material diamond mesh structure, comprising:
providing a starting material comprising a substantially uniplanar plastic having a pattern of holes or depressions whose centres are on two sets of notional parallel lines which are at a substantial angle to each other; wherein the holes or depressions before stretching are in rows extending generally at right angles to the first stretching direction, the holes or depressions of alternate rows being generally aligned in the first stretching direction, the first distance between the sides of two adjacent holes or depressions in the same row being at least 1.5 times the second distance between the side of one hole or depression and the side of the generally aligned depression in the alternate rows; and
stretching the starting material in a first direction at a substantial angle to each set of lines and thereby drawing out into orientated strands the zones between immediately adjacent holes or depressions in each line to form mesh openings, which strands are interconnected by junctions formed from the zones between pairs of holes or depressions which are adjacent in the direction of stretching, which junctions provide crotches between respective adjacent strands, respective pairs of opposite crotches being aligned in the direction of stretching and in the direction normal to stretching, which junctions are orientated along their lateral zones which extend parallel to the direction of stretching, to provide continuous lines of orientated plastic material running through the structure generally in the direction of stretching, each line comprising in succession a strand, the lateral zone of a junction, another strand, the lateral zone of the next junction, and so on, each junction having between its lateral zones a single zone which is either unorientated or substantially less orientated than the lateral zones, which single zone extends as far as the two opposite crotches, between respective adjacent strands, which are generally aligned in the direction of stretching.

7. The method of claim 6, wherein the holes or depressions before stretching are long-shaped with their major axes substantially parallel to the direction of stretching.

8. The method of claim 7, wherein the holes or depressions before stretching are elliptical.

9. The method of claim 7 wherein the holes or depressions before starting are slots with radiused ends.

10. The method of claim 9 wherein before stretching the holes or depressions of adjacent rows are overlapping.

11. The method of claim 6, wherein before stretching the holes or depressions of adjacent rows are overlapping.

12. The method of claim 6, wherein the starting material has a non-rectilinear edge so that when the starting material is stretched, the edge zones are stretched to a ratio which is not substantially greater than that of the zones between immediately adjacent holes or depressions in each line.

13. The method of claim 6 wherein the holes or depressions before stretching are round.

14. The method of claim 6, 7, 8, 11, 12 or 13 wherein the structure is subsequently stretched in a second direction substantially at right angles to the first direction of stretching, to further stretch the junctions and form from said single zone an orientated zone in and adjacent each of the remaining two crotches between pairs of adjacent strands with the preferred direction of orientation extending around the crotches, and a central zone comprising the residual unorientated or less orientated plastic material.

* * * * *